United States Patent
Shockley et al.

(10) Patent No.: US 11,873,123 B2
(45) Date of Patent: Jan. 16, 2024

(54) AEROSPACE VEHICLE NAVIGATION AND CONTROL SYSTEM COMPRISING TERRESTRIAL ILLUMINATION MATCHING MODULE FOR DETERMINING AEROSPACE VEHICLE POSITION AND ATTITUDE

(71) Applicant: Government of the United States, as represented by the Secretary of the Air Force, Wright-Patterson AFB, OH (US)

(72) Inventors: Liberty M. Shockley, Albuquerque, NM (US); Robert A. Bettinger, Oakwood, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 619 days.

(21) Appl. No.: 17/123,810

(22) Filed: Dec. 16, 2020

(65) Prior Publication Data

US 2021/0206519 A1    Jul. 8, 2021

Related U.S. Application Data

(60) Provisional application No. 62/957,250, filed on Jan. 5, 2020.

(51) Int. Cl.
*B64G 3/00*    (2006.01)
*B64G 1/24*    (2006.01)
(Continued)

(52) U.S. Cl.
CPC ............... *B64G 3/00* (2013.01); *B64G 1/242* (2013.01); *B64G 1/244* (2019.05); *G01C 21/24* (2013.01);
(Continued)

(58) Field of Classification Search
CPC .......... B64G 3/00; B64G 1/242; B64G 1/244; B64G 1/245; B64G 1/26; B64G 1/285;
(Continued)

(56) References Cited

U.S. PATENT DOCUMENTS

| | | |
|---|---|---|
| 4,658,361 A | 4/1987 | Kosaka et al. |
| 4,688,092 A | 8/1987 | Kamel et al. |

(Continued)

OTHER PUBLICATIONS

Kouyama, T.; Kanemura, A.; Kato, S.; Imamoglu, N.; Fukuhara, T.; Nakamura, R.; Satellite Attitude Determination and Map Projection Based on Robust Image Matching; Remote Sens. 2017, 9, 90.

(Continued)

*Primary Examiner* — Geepy Pe
*Assistant Examiner* — Kimia Kohankhaki
(74) *Attorney, Agent, or Firm* — AFMCLO/JAZ; James F. McBride

(57) ABSTRACT

The present invention relates to an aerospace vehicle navigation and control system comprising a terrestrial illumination matching module for determining spacecraft position and attitude. The method permits aerospace vehicle position and attitude determinations using terrestrial lights using an Earth-pointing camera without the need of a dedicated sensor to track stars, the sun, or the horizon. Thus, a module for making such determinations can easily and inexpensively be made onboard an aerospace vehicle if an Earth-pointing sensor, such as a camera, is present.

14 Claims, 2 Drawing Sheets

(51) Int. Cl.
*G01C 21/24* (2006.01)
*G06T 7/73* (2017.01)
*G06T 7/277* (2017.01)

(52) U.S. Cl.
CPC ............... *G06T 7/277* (2017.01); *G06T 7/74* (2017.01); *B64G 1/245* (2023.08); *G06T 2207/30181* (2013.01); *G06T 2207/30244* (2013.01)

(58) Field of Classification Search
CPC .. B64G 1/32; B64G 1/36; G06T 7/277; G06T 7/74; G06T 2207/30181; G06T 2207/30244; G06T 2207/10016; G06T 2207/10032; G06T 2207/20076; G01C 21/24; G01C 21/005
See application file for complete search history.

(56) References Cited

U.S. PATENT DOCUMENTS

| | | |
|---|---|---|
| 4,746,976 A | 5/1988 | Kamel et al. |
| 5,204,818 A | 4/1993 | Landecker |
| 2008/0004758 A1* | 1/2008 | Lane .................. B64G 1/36 701/13 |
| 2017/0008650 A1* | 1/2017 | Zhang .................. B64G 3/00 |

OTHER PUBLICATIONS

Miranda N. Straub, M.N.; Christiany, J. A.; Autonomous Optical Navigation for Earth-Observing Satellites Using Coastline Matching; AIAA SciTech Forum, Jan. 5-9, 2015, AIAA Guidance, Navigation, and Control Conference.

Van Pham, B.; Simon Lacroixy, S.; Devyz, M.; Visual Landmark Constellation matching for spacecraft pinpoint landing; AIAA Guidance, Navigation, and Control Conference Aug. 10-13, 2009, Chicago, Illinois.

* cited by examiner

AEROSPACE VEHICLE NAVIGATION AND CONTROL SYSTEM COMPRISING TERRESTRIAL ILLUMINATION MATCHING MODULE FOR DETERMINING AEROSPACE VEHICLE POSITION AND ATTITUDE

RIGHTS OF THE GOVERNMENT

The invention described herein may be manufactured and used by or for the Government of the United States for all governmental purposes without the payment of any royalty.

FIELD OF THE INVENTION

The present invention relates to an aerospace vehicle navigation and control system comprising a terrestrial illumination matching module for determining aerospace vehicle position and attitude.

BACKGROUND OF THE INVENTION

Aerospace vehicle's need to periodically determine their position with respect to the Earth so they can stay on their flight path or orbit. In order to determine such position, an aerospace vehicle must be able to determine its pose estimation between two points in time and/or attitude with respect to the Earth. Currently, aerospace vehicles such as satellites primarily use star trackers to determine their orbital position. The manner in which other aerospace vehicles determine their position with respect to the earth is found in Table 1. All of the current methods of determining an aerospace vehicle's position with respect to the earth cannot determine pose estimation between two points in time and/or attitude through one sensor and such sensors must be dedicated sensors. As dedicated sensors are required, the aerospace vehicle requires additional mission specific sensors that add undesired bulk and weight. Furthermore, the further away from the earth that the aerospace is positioned, the more difficult the task of determining such aerospace's position with respect to the earth becomes.

Applicants recognized that the source of the problems associated with current methods lie in the use of complex inputs such as starlight that require that sensors which are positioned such that they cannot focus on the earth. In view of such recognition, Applicants discovered that earth light, such the light emitted by cities, could substitute for starlight. Thus, sensors that are mission specific that are focused on the earth could be dual use sensors that acquire mission specific information and information for determining an aerospace vehicle's position. As a result, the bulk and weight of an aerospace vehicle can be significantly reduced. In addition, to the aforementioned benefits, Applicants aerospace vehicle navigation and control system can serve as a backup navigation and control system for any conventional system thus obviating the need for other backup navigation systems that would inherently introduce unwanted bulk and weight to the subject aerospace vehicle.

SUMMARY OF THE INVENTION

The present invention relates to an aerospace vehicle navigation and control system comprising a terrestrial illumination matching module for determining spacecraft position and attitude. The method permits aerospace vehicle position and attitude determinations using terrestrial lights using an Earth-pointing camera without the need of a dedicated sensor to track stars, the sun, or the horizon. Thus, a module for making such determinations can easily and inexpensively be made onboard an aerospace vehicle if an Earth-pointing, sensor such as a camera is present.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
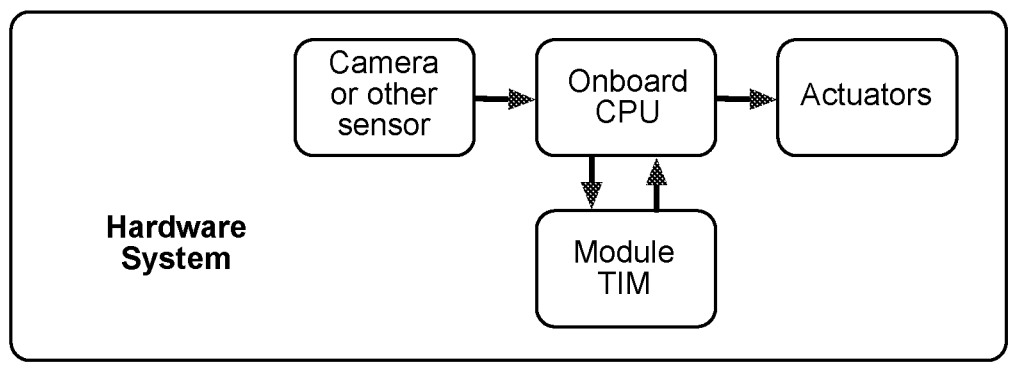
FIG. 1 is the hardware system schematic and block diagram comprising the terrestrial illumination matching (TIM) module, a camera and/or other sensor which generates terrestrial light images, an onboard central processing unit (CPU), and vehicle actuators.
Figure 2A:
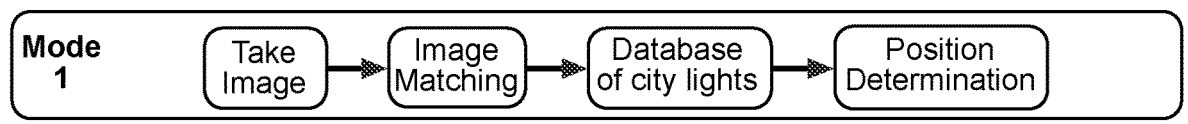
FIG. 2A presents the first mode of operation for the module, which gives the aerospace vehicle's pose following the processing of terrestrial light images.
Figure 2B:
FIG. 2B presents the second mode of operation for the module, which gives the aerospace vehicle's attitude following the processing of terrestrial light images.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Evening Civil Twilight is the period that begins at sunset and ends in the evening when the center of the sun's disk is six degrees below the horizon. Morning Civil Twilight begins prior to sunrise when the center of the sun's disk is six degrees below the horizon, and ends at sunrise. The most recent version of the Air Almanac as published by the U.S. government should be used to as the source of the sun's position on the day in question.

Nomenclature, Subscripts and Background
  a=semi-major radius
  b=semi-minor radius
  C=attitude matrix
  e=eccentricity
  ê=unit vector of s
  E=Essential Matrix
  $e^2$=square of first eccentricity
  f=flattening of the planet
  $f$=process nonlinear vector function
  F=matrix of linearized dynamics
  F=Fundamental matrix
  $f_c$=focal length of camera
  g=gravitational acceleration
  H=Jacobian of measurement sensitivity
  h=observation function
  $h_E$=height of vehicle above Earth's surface
  I=identity matrix
  JD=Julian Day
  K=Kalman gain
  k=equatorial gravity constant
  N=radius of curvature of vertical prime
  n=integer number
  P=covariance of state
  Q=process noise covariance matrix
  $q_0$=equatorial gravity
  R=measurement noise covariance matrix
  R=rotation matrix between coordinate frames
  r=vehicle position
  s=measurement from camera to point on earth
  T=pose matrix
  t=translation
  t=time
  u=input vector
  v=vehicle velocity
  w=measurement noise
  W=weights
  x=state vector
  X=image coordinate
  y=measurement
  Y=expected measurement
  β=reduced latitude
  Γ=residuals of observations
  Δ=change or nutation
  ε=obliquity of the ecliptic
  θ=Greenwich Apparent Sidereal Time
  κ=filter tuning value
  μ=gravitational parameter
  σ=accuracy of sensor
  ν=residual
  φ=latitude, deg
  χ=set of sigma points
  ψ=longitude
  ω=angular rate Super/Subscripts
  −=state a priori, but after propagation
  +=state a posteriori
  0=initial state
  c=integer number
  CAM=camera frame
  E=conditions for the Earth
  ECEF=measured with respect to a rotating frame
  ECI=measured with respect to an inertial frame
  gc=geocentric
  gd=geodetic
  I=inertial
  i=integer index
  k=timestep
  m=integer number
  m=mean
  n=integer number
  n=normalized
  xx=predicted mean covariance
  xy=predicted cross covariance
  yy=predicted observed covariance Kalman Filters Kalman Filter (KF), an Extended Kalman Filter (EKF) and/or an Unscented Kalman Filter (UKF) are used to propagate a state vector and update with a measurement. Typically, the accuracy of said aerospace vehicle's propagated position and/or attitude is best if an Unscented Kalman Filter is used, with the next best filter being an Extended Kalman Filter and/or a Kalman Filter. Suitable of applying such filters are presented below.

Kalman Filter: Given the system dynamics along with $x_k^-$, $P_k^-$, $y_k$, $Q_k$, and $R_k$ the Kalman Gain is calculated as follows:

$$K_k = P_k^- H^T (H P_k^- H^T + R)^{-1}$$

The current state estimate is $$\hat{x}_k^+ = \hat{x}_k^- + K_k(y_k - H\hat{x}_k^-)$$

and the current covariance $$P_k^+ = P_k^- - K_k H P_k^-$$

The system is then propagated from k to k+1 with $$\hat{x}_{k+1}^- = f(\hat{x}_k^+, t)$$

$$F(t) = \frac{\partial f(x, t)}{\partial x}\bigg|_{x=\hat{x}}$$

and $$P_{k+1}^- = F P_k^+ F^T + Q_k$$

Extended Kalman Filter: The position estimator will rely on the use of an EKF based on its use in contemporary literature, as well as the specific application using the camera frame. Attempting to write the process in sequential order for an EKF, it is formulated by first defining the system dynamics as $$\dot{x} = f(x, t)$$

and the covariance matrix, P, is able to be propagated by $$\dot{P} = FP + PF^T + Q$$

where $$F(t) = \frac{\partial f(x, t)}{\partial x}\bigg|_{(x=x^*)}$$

and Q is the process noise. It is evaluated at the expected values of the state dynamics. The measurement y, is related to the state vector by the relation $$y = h(x, t)$$

Letting H be the Jacobian of this relationship, also known as the measurement sensitivity matrix, $$H = \frac{\partial h}{\partial x}\bigg|_{(x=x^*)}$$

This is found using the Line of Sight measurements by using the Inertial to Camera frame, and the dot product of the unit vectors in the inertial frame $$H_k = R_{CAM}^{ECI} \frac{1}{\|s_k\|}\left[\{\hat{e}_k^{ECI}\hat{e}_k^{ECI^T} - I_{3\times3}\}0_{3\times3}\right]$$

$R_{CAM}^{-1}$ is found by assuming the attitude at the time the image was taken is known. At this point the measurement noise covariance is needed and determined as $$R = \sigma^2(I_{3\times3} - \bar{e}_k^{CAM}e_k^{CAM^T})$$

For the Kalman Gain and using the measurement, determine the residual to be $$v_k = y_k - h(x_k, t_k)$$

The Kalman gain for the system can be calculated as $$K_k = P_k^- H_k^T (H_k P_k^- H_k^T + R_k)^{-1}$$

where P is the expected mean squared error and R is the known covariance.

The current state estimate can be updated using this gain and the residual $$\hat{x}_k^+ = \hat{x}_k^- + K_k(y_k - H_k \hat{x}_k^-)$$

The current covariance must also be updated as $$P_k^+ = P_k^- - K_k H_k P_k^-$$

Unscented Kalman Filter: An Unscented Kalman filter is the preferred type of filter to use for nonlinear discrete time systems. The equations for an Unscented Kalman Filter are $$x_{k+1} = f(x_k, u_k, v_k, k), y_k = h(x_k, u_k, k) + w_k$$

A set of points (sigma points, $\chi$) are deterministically selected such that their mean and covariance match that of the state. There are 2n+1 sigma points and associated weights; points are chosen in the classic UKF to match first two moments.

$$\chi^m = \bar{x},$$

$$W_0 = \frac{\kappa}{n+\kappa}$$

$$\chi_i^m = \bar{x} + (\sqrt{(n+\kappa)P_{xx}})_i,$$

$$W_i = \frac{1}{2(n+\kappa)}$$

$$\chi_{i+n}^m = \bar{x} - (\sqrt{(n+\kappa)P_{xx}})_i,$$

$$W_{i+n} = \frac{1}{2(n_k)}$$

Each sigma point is propagated through $$\chi_{k|k-1}^{(i)} = f(\chi_{k-1}^{(i)})$$

which are averaged to find a predicted mean, used to compute a covariance $$P_{xx,k}^- = \sum_{i=0}^{2n} W_i^c (\chi_{k|k-1}^i - \hat{\bar{x}}_k^-)(\chi_{k|k-1}^i - \hat{\bar{x}}_k^-)^T + Q_{k-1}$$

Now consider residual information, and transform the sigma points to observations $$\Gamma_{k|k-1}^{(i)} = h(\chi_{k|k-1}^{(i)})$$

Average the transformed sigma points to determine an expected measurement $$\hat{Y}_k = \sum_{i=0}^{2n} W_i^m \Gamma_{k|k-1}^{(i)}$$

Having an expected measurement, the predicted observation covariance can be determined $$P_{yy,k} = \sum_{i=0}^{2n} W_i^c (\Gamma_{k|k-1}^{(i)} - \hat{Y}_k^-)(\Gamma_{k|k-1}^{(i)} - \hat{Y}_k^-)^T + R_k$$

as well as the predicted cross covariance $$P_{xy,k} = \sum_{i=0}^{2n} W_i^c (\chi_{k|k-1}^i - \hat{\bar{x}}_k^-)(\Gamma_{k|k-1}^{(i)} - \hat{Y}_k^-)^T$$

Finally, the standard Kalman filter update can be applied $$v = Y - \hat{Y}_k$$

$$K_k = P_{xy} P_{yy}^{-1}$$

$$\bar{x}_k^+ = \bar{x}_k^- + K_k v$$

$$P_{xx,k}^+ = P_{xx,k}^- - K_y P_{yy} K_k^T$$

TABLE 1

Aerospace Vehicle Type and Modes of Guidance, Navigation, and Control

| Vehicle | GNC Methods | Maneuver Method |
|---|---|---|
| AIR | | |
| Weather Balloon | radiosonde, theodolite | pressure inside balloon |
| Manned aircraft | altimeter, inertial navigation system (INS), Global Positioning System (GPS) | thrust, flight control surfaces |
| Unmanned aircraft | altimeter, INS, GPS | thrust, flight control surfaces |
| Quadcopter | visual sensor, GPS | propeller(s) |
| Airborne Missile | altimeter, INS, GPS | thrust, flight control surfaces |
| AEROSPACE | | |
| Scientific Balloon | star camera, altimeter | pressure inside balloon |
| Sounding Rocket | ring laser gyro, altimeter, accelerometers | thrust, flight control surfaces |
| Space Shuttle | human-in-the-loop, star camera | thrust, flight control surfaces |

TABLE 1-continued

Aerospace Vehicle Type and Modes of Guidance, Navigation, and Control

| Vehicle | GNC Methods | Maneuver Method |
| --- | --- | --- |
| Launch Vehicle (Rocket) | INS, ring laser gyro, altimeter, accelerometers | thrust, flight control surfaces |
| Ballistic Missile | INS, GPS | thrust, flight control surfaces |
| SPACE | | |
| Satellite | star camera, sun sensor, horizon sensor, GPS | thruster, electric propulsion, magnetorquer, momentum wheel |
| Space Station | human, star camera, sun sensor, horizon sensor, GPS | thruster, electric propulsion, magnetorquer, momentum wheel |
| Interplanetary Vehicle | star camera, sun sensor | thruster, electric propulsion, momentum wheel |

Examples of Flight Control Surfaces: Fins, Ailerons, Elevators.
Thrust includes the two-directional thrust force, as well as any gimbaled thrust vectoring the vehicle is capable of generating.

Method of Determining an Aerospace Vehicle's Position

Applicants disclose a method of determining an aerospace vehicle's position with respect to the Earth, determining the aerospace vehicle's pose estimation between two points in time and/or attitude with respect to the Earth wherein:
a) determining an aerospace vehicle's position with respect to the Earth comprises:
   (i) having an aerospace vehicle acquire, at a time from Evening Civil Twilight to Morning Civil Twilight, an image of the Earth comprising at least one terrestrial light feature;
   (ii) matching said least one terrestrial light feature of the image with at least one feature of a terrestrial light data base;
   (iii) weighting said matched images;
   (iv) optionally, calculating the aerospace vehicle's propagated position and checking the result of said propagated position against the weighting;
   (v) using the time and altitude that said image was taken to convert said weighted match into inertial coordinates;
   (vi) optionally updating said aerospace vehicle's propagated position by using the inertial coordinates in a propagation position and/or attitude calculation; and/or
b) determining the aerospace vehicle's pose estimation between two points in time comprising:
   (i) having an aerospace vehicle acquire, at a time from Evening Civil Twilight to Morning Civil Twilight, at least two images of the Earth at different times, each of said images containing at least one common terrestrial light feature;
   (ii) comparing said two images to find at least one common terrestrial light feature;
   (iii) calculating the pose as follows:
      converting the image's camera coordinates to normalized coordinates;
      calculating an essential matrix from the normalized coordinates and then recovering the pose from the essential matrix; or
      converting the image's camera coordinates to normalized coordinates;
      converting the normalized coordinates to pixel coordinates;
      calculating a fundamental matrix from the pixel coordinates and then recovering the pose;
   (iv) combining a known absolute position and attitude of the aerospace vehicle with the recovered pose to yield an updated attitude and an estimated position for the aerospace vehicle.

Applicants disclose a method of determining an aerospace vehicle's position with respect to the Earth, determining the aerospace vehicle's pose estimation between two points in time and/or attitude with respect to the Earth wherein:
a) determining an aerospace vehicle's position with respect to the Earth comprises:
   (i) having an aerospace vehicle acquire, at a known general altitude and at time from Evening Civil Twilight to Morning Civil Twilight, an image of the Earth comprising at least one terrestrial light feature;
   (ii) matching, using Lowe's ratio test, said least one terrestrial light feature of the image with at least one feature of a terrestrial light data base;
   (iii) weighting, to a scale of one, said matched images;
   (iv) optionally, calculating the aerospace vehicle's propagated position, using a Kalman Filter, an Extended Kalman Filter and/or an Unscented Kalman Filter, (typically the accuracy of said aerospace vehicle's propagated position and/or attitude is best if an Unscented Kalman Filter is used, with the next best filter being an Extended Kalman Filter) and checking the result of said propagated position against the weighting;
   (v) using the time and altitude that said image was taken at to convert said weighted match into inertial coordinates by transforming a state vector containing position and velocity from Earth-Centered-Earth-Fixed (ECEF) coordinates to Earth-Centered-Inertial (ECI) coordinates using the following equations:

$$r^{ECI} = R r^{ECEF}$$

$$v^{ECI} = R v^{ECEF} + \dot{R} r^{ECEF}$$

$$R = \begin{bmatrix} -\sin\theta & -\cos\theta & 0 \\ \cos\theta & -\sin\theta & 0 \\ 0 & 0 & 0 \end{bmatrix}$$

$$\dot{R} = \omega_E R$$

where θ represents the Greenwich Apparent Sidereal Time, measured in degrees and computed as follows:

$$\theta = [\theta_m + \Delta\psi \cos(\varepsilon_m + \Delta\varepsilon)] \cdot \mod(360°)$$

where the Greenwich mean sidereal time is calculated as follows:

$$\theta_m = 100.46061837 + (36000.770053608)t + (0.000387933)t^2 - (1/38710000)t^3$$

where t represents the Terrestrial Time, expressed in 24-hour periods and the Julian Day (JD):

$$t = \frac{JD - 2000 \text{ January } 01^d 12^h}{36525}$$

wherein the mean obliquity of the ecliptic is determined from:

$\varepsilon_m = 23°26'21."448 - (46."8150)t - (0."00059)t^2 + (0."001813)t^3$ wherein the nutations in obliquity and longitude involve the following three trigonometric arguments:

$L = 280.4665 + (36000.7698)t$ $L' = 218.3165 + (481267.8813)t$ $\Omega = 125.04452 - (1934.136261)t$ and, the nutations are calculated using the following equations:

$\Delta\psi = -17.20 \sin\Omega - 1.32 \sin(2L) - 0.23 \sin(2L') + 0.21 \sin(2\Omega)$ $\Delta\varepsilon = 9.20 \cos\Omega + 0.57 \cos(2L) + 0.10 \cos(2L') - 0.09 \cos(2\Omega)$ then using, the equations for the position, r, and velocity, v, in the ECI frame to calculate the position and velocity in the ECEF frame using the dimensions of the earth, preferably the following dimensions for the Earth are used:

$a = 6378137 m$ $b = 6356752.3142 m$ $q_0 = 9.7803267714 m/s^2$ $k = 0.00193185138639$ $e^2 = 0.00669437999013$ when longitude is calculated from the ECEF position by:

$$\psi = \arctan\left[\frac{r_y^{ECEF}}{r_x^{ECEF}}\right]$$

The geodetic latitude, $\varphi_{gd}$, is calculated using Bowring's method:

$$\overline{\beta} = \arctan\left[\frac{r_z^{ECEF}}{(1-f)s}\right]$$

$$\varphi_{gd} = \arctan\left[\frac{r_z^{ECEF} + \frac{e^2(1-f)}{(1-e^2)}R\sin^3\beta}{s - e^2 R\cos^3\beta}\right]$$

finally the geocentric latitude is calculated from the geodetic, $$\tan\varphi_{gd} = \frac{\left(\frac{a_e(1-e^2)}{\sqrt{1-e^2\sin^2\varphi_{gd}}} + h_{gd}\right)}{\left(\frac{a_e}{\sqrt{1-e^2\sin^2\varphi_{gd}}} + h_{gd}\right)}\tan\varphi_{gd}$$

where f is the flattening of the planet; $e^2$ is the square of the first eccentricity, or $e^2 = 1-(1-f)^2$; and $s = (r_x^{ECEF} + r_y^{ECEF})^{1/2}$. such calculation is iterated at least two times, preferably at least three times to provide a converged solution, known as the reduced latitude, that is calculated by:

$$\beta = \arctan\left[\frac{(1-f)\sin\varphi}{\cos\varphi}\right]$$

wherein the altitude, $h_E$, above Earth's surface is calculated with the following equation:

$h_E = (s \cdot \cos\varphi + r_z^{ECEF} + e^2 N \sin\varphi)\sin\varphi - N$ wherein the radius of curvature in the vertical prime, N, is found with $$N = \frac{R}{[1 - e^2\sin^2\varphi]^{1/2}}$$

(vi) optionally updating said aerospace vehicle's propagated position by using the inertial coordinates in a propagation position and/or attitude calculation wherein said calculation uses a Kalman Filter, an Extended Kalman Filter and/or an Unscented Kalman Filter (typically the accuracy of said aerospace vehicle's propagated position and/or attitude is best if an Unscented Kalman Filter is used, with the next best filter being an Extended Kalman Filter and/or a Kalman Filter.

b) determining the aerospace vehicle's pose estimation between two points in time comprising:
(i) having an aerospace vehicle acquire, at a time from Evening Civil Twilight to Morning Civil Twilight, at least two images of the Earth at different times, each of said images containing at least one common terrestrial light feature;
(ii) comparing said two images to find at least one common terrestrial light feature;
(iii) calculating the pose by first converting the image's camera coordinates to normalized coordinates using the following equations and method wherein the camera's reference frame is defined with a first axis aligned with the central longitudinal axis of the camera, a second axis, that is a translation of said first axis and a normalization of said camera's reference frame, a third axis that is a rotation and translation of said second axis to the top left corner of said image with the x-axis aligned with the local horizontal direction and the y-axis points down the side of the image from this top left corner and wherein said rotation is aided by the camera's calibration matrix, containing the focal lengths of the optical sensor, which map to pixel lengths, $$X_c = \begin{bmatrix} x_{CAM} \\ y_{CAM} \\ z_{CAM} \end{bmatrix}$$

$$X_n = \begin{bmatrix} x_n \\ y_n \end{bmatrix} = \begin{bmatrix} x_{CAM}/z_{CAM} \\ y_{CAM}/z_{CAM} \end{bmatrix}$$

$$X_p = \begin{bmatrix} x_p \\ y_p \end{bmatrix} = \begin{bmatrix} f_c & 0 \\ 0 & f_c \end{bmatrix} \begin{bmatrix} x_n \\ y_n \end{bmatrix} + \begin{bmatrix} n_x/2 \\ n_y/2 \end{bmatrix}$$

(iv) calculating the essential matrix from the normalized coordinates and then recovering the pose from the essential matrix using the following equations, wherein the equation for the epipolar constrain is defined as follows:

$x_{n_1}^T(t \times R\underline{x}_{n_0}) = 0$ and said equation for the epipolar constraint is rewritten as the following linear equation:

$\underline{x}_{n_1}^T[t_x]R\underline{x}_{n_0} = 0$ where $$[t]_x = \begin{bmatrix} 0 & -t_z & t_y \\ t_z & 0 & -t_x \\ -t_y & t_x & 0 \end{bmatrix}$$

[$t_x$] is saying the translation vector should be skewed (showing an operation) and $[t]_x$ is showing post-operation the skewed vector into a matrix.

the matrix $[t]_x$ is redefined using the Essential Matrix, E:

$\underline{x}_{n_1}^T E \underline{x}_{n_0} = 0$ where $E = R[t]_x$ and the Essential Matrix is scaled or unscaled. If scaled, then the scale is known from the two images, and reflects six degrees of freedom.
wherein other constraints on the Essential Matrix are the following:

$\det(E) = 0$ $2EE^TE - tr(EE^T)E = 0$ or, when the epipolar constraint is applied to pixel coordinates, then the Fundamental Matrix, F, is used:

$\underline{x}_{p_1}^T F \underline{x}_{p_0} = 0$ said equation is then solved for the Fundamental Matrix and the pose is recovered from the Essential and/or Fundamental Matrices wherein said pose is defined as:

$T = [R|t]$ (iv) combining the known absolute position and attitude of the aerospace vehicle with the recovered pose to yield an updated attitude and estimated position for the aerospace vehicle wherein said combining step is achieved by using the following equations wherein the attitude, $C_1$ at the second image is defined by $C_1 = C_0 + R$ wherein $C_0$ is preferably defined as zero if it is not previously known; and inertial position corresponding to the second image is found by adding the scaled change in position, t, to the previous inertial position:

$r_1 = r_0 + t$.

Module and Aerospace Vehicle Comprising Same

For purposes of this specification, headings are not considered paragraphs and thus this paragraph is Paragraph 0022 of the present specification. The individual number of each paragraph above and below this paragraph can be determined by reference to this paragraph's number. In this paragraph 0022, Applicants disclose a module comprising a central processing unit programmed to determine an aerospace vehicle's position with respect to the Earth, an aerospace vehicle's pose estimation between two points in time and/or attitude with respect to the Earth according to the method of Paragraph 0020.

Applicants disclose a module comprising a central processing unit programmed to determine an aerospace vehicle's position with respect to the Earth, an aerospace vehicle's pose estimation between two points in time and/or attitude with respect to the Earth according to the method of Paragraph 0021.

Applicants disclose the module of Paragraphs 0022 through 0023, said module comprising an input/output controller, a random access memory unit, and a hard drive memory unit, said input/output controller being configured to receive a first digital signal, preferably said first digital signal comprises data from a sensor, more preferably said first digital signal comprises digitized imagery, and transmit a second digital signal comprising the updated aerospace vehicle's position and/or attitude, to said central processing unit.

Applicants disclose an aerospace vehicle comprising:
a) a module according to any of Paragraphs 0022 through 0024;
b) a sensor pointed towards the earth, preferably said sensor comprises a camera;
c) an internal and/or external power source for powering said aerospace vehicle
d) an onboard central processing unit; and
e) a means to maneuver said aerospace vehicle, preferably said means to maneuver said aerospace vehicle is selected from the group consisting of a flight control surface, propeller, thruster, electric propulsion, magnetorquer, momentum wheel, more preferably said means to maneuver said aerospace vehicle is selected from the group consisting of thruster, electric propulsion, magnetorquer, momentum wheel.

When Applicants method is employed the position of the aerospace vehicle is supplied to the vehicle's guidance system and/or to one or more individuals who are guiding the aerospace vehicle so the aerospace vehicle may be guided in the manner desired to achieve the mission of said aerospace vehicle.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

The aerospace vehicle pose and attitude determination method is implemented for the Suomi NPP spacecraft in low Earth, sun-synchronous near-polar orbit at an altitude of approximately 825 km. The spacecraft features an Earth-pointing camera with a day/night light collection band of 0.7 microns in the visible spectrum, and a ground field-of-view of 1500 km. At 150-second time steps, and exactly over the Great Lakes and U.S. Midwest region, the Earth-pointing camera takes nighttime terrestrial images. Using the pose determination method, the images are compared with a known terrestrial lights database which is used as the "truth" dataset. Following comparison, the module computes an inertial orbital position vector and inertial orbital velocity vector for the spacecraft. Using the attitude determination method, the images are compared with the same "truth" terrestrial lights database. Following comparison, the module computes the spacecraft's change of attitude in terms of roll, pitch, and yaw, respectively.

The aerospace vehicle pose determination method is implemented for a commercial aviation flight across the U.S. from Cincinnati, Ohio, to Pensacola, Florida. This route contains many major cities in its field of view during flight, such as Louisville, Kentucky; Nashville, Tennessee; and Atlanta, Georgia. The aircraft will be flying at 10,050 meters at 290 meters per second during nighttime, with a camera in the visible spectrum. Taking images every 15 minutes (900 seconds), an accurate position can be found to verify the plane is still on the pre-determined flight plan in the case of GPS failure by comparing the images with a known terrestrial lights database.

The aerospace vehicle pose and attitude determination method is implemented for a scientific balloon flight carrying a payload and a ground-pointing camera in the visible spectrum launching out of Fort Sumner, New Mexico, during a calm day. The balloon rises to a height of 31,500 meters over a period of two hours. The balloon will stay at altitude, fluctuating slightly during civil twilight, and descend over a period of minutes, when the balloon is separated from the payload and falls back to Earth with a parachute deployment. The pose determination method will be able to function during ascent and account for the changing altitude, since the resolution of the camera will stay constant, and still be able to determine a very accurate position measurement. At the desired operating altitude, tracking position is essential so the balloon payload is not released over a populated area, which could cause harm to the population. The balloon would also be able to track attitude, which is essential for the pointing of the instrument, such as a telescope or sensor. For both pose and attitude determination, images are taken of terrestrial lights and compared with a known terrestrial lights database.

The aerospace vehicle pose and attitude determination method is implemented for a re-entry vehicle with a ground-pointing camera in the visible spectrum returning from Low Earth Orbit at 200,000 meters to the ground, usually a water landing at zero meters. As with the balloon, this method is useful at determining the rapidly changing altitude the vehicle will experience, taking images right before and directly after the re-entry event, upon entering the sensible atmosphere. Terrestrial light matching with a known terrestrial lights database would act as a back-up or an alternative to the star tracker, GPS, and INS, that many space and air vehicles use for position and attitude, without having to switch modes. The terrestrial light matching module would not function during the re-entry event itself due to high temperatures and light experienced by the vehicle entering the atmosphere at high speeds.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of determining an aerospace vehicle's position with respect to the Earth, comprising determining the aerospace vehicle's pose estimation between two points in time and/or attitude with respect to the Earth wherein:
    a) determining the aerospace vehicle's position with respect to the Earth comprises:
        (i) having the aerospace vehicle acquire, at a time from Evening Civil Twilight to Morning Civil Twilight, an image of the Earth comprising at least one terrestrial light feature;
        (ii) matching said at least one terrestrial light feature of the image with at least one feature of a terrestrial light data base;
        (iii) weighting said matched images;
        (iv) optionally, calculating a propagated position for said aerospace vehicle and checking the result of said propagated position against the weighting;
        (v) using the time and the altitude that said image was taken to convert said weighted match into inertial coordinates;
        (vi) optionally updating said aerospace vehicle's propagated position by using the inertial coordinates in a propagation position and/or an attitude calculation; and/or
    b) determining the aerospace vehicle's pose estimation between two points in time comprises:
        (i) having the aerospace vehicle acquire, at a time from Evening Civil Twilight to Morning Civil Twilight, at least two images of the Earth at different times, each of said at least two images containing at least one common terrestrial light feature;
        (ii) comparing said at least two images to find the at least one common terrestrial light feature;
        (iii) calculating the aerospace vehicle's pose as follows:
            converting image coordinates of the at least two images that were acquired by a camera to normalized coordinates;
            calculating an essential matrix from the normalized coordinates and then recovering the pose from the essential matrix; or
            converting image coordinates of the at least two images that were acquired by a camera to normalized coordinates;
            converting the normalized coordinates to pixel coordinates;
            calculating a fundamental matrix from the pixel coordinates and then recovering the pose;
        (iv) combining a known absolute position and attitude of the aerospace vehicle with the recovered pose to yield an updated attitude and estimated position for the aerospace vehicle.

2. A method of determining an aerospace vehicle's position with respect to the Earth, determining the aerospace vehicle's pose estimation between two points in time and/or attitude with respect to the Earth wherein:
    a) determining the aerospace vehicle's position with respect to the Earth comprises:
        (i) having the aerospace vehicle acquire, at a known general altitude and at a time from Evening Civil Twilight to Morning Civil Twilight, an image of the Earth comprising at least one terrestrial light feature;

(ii) matching, using Lowe's ratio test, said at least one terrestrial light feature of the image with at least one feature of a terrestrial light data base;

(iii) weighting, to a scale of one, said matched images;

(iv) optionally, calculating a propagated position for said aerospace vehicle using at least one of a Kalman Filter, an Extended Kalman Filter and an Unscented Kalman Filter, and checking the result of said propagated position against the weighting;

(v) using the time and the altitude that said image was taken at to convert said weighted match into inertial coordinates by transforming a state vector containing position and velocity from Earth-Centered-Earth-Fixed (ECEF) coordinates to Earth-Centered-Inertial (ECI) coordinates using the following equations:

$r^{ECI} = R r^{ECEF}$ $v^{ECI} = R v^{ECEF} + \dot{R} r^{ECEF}$ $$R = \begin{bmatrix} -\sin\theta & -\cos\theta & 0 \\ \cos\theta & -\sin\theta & 0 \\ 0 & 0 & 0 \end{bmatrix}$$

$\dot{R} = \omega_E R$ where $\theta$ represents the Greenwich Apparent Sidereal Time, measured in degrees and computed as follows:

$\theta = [\theta_m + \Delta\psi \cos(\varepsilon_m + \Delta\varepsilon)] \cdot \mod(360°)$ where the Greenwich mean sidereal time is calculated as follows:

$\theta_m = 100.46061837 + (36000.770053608)t + (0.000387933)t^2 - (1/38710000)t^3$ where t represents the Terrestrial Time, expressed in 24-hour periods and the Julian Day (JD):

$$t = \frac{JD - 2000 \text{ January } 01^d 12^h}{36525}$$

wherein the mean obliquity of the ecliptic is determined from:

$\varepsilon_m = 23°26'21.''448 - (46.''8150)t - (0.0''00059)t^2 + (0.''001813)t^3$ wherein the nutations in obliquity and longitude involve the following three trigonometric arguments:

$L = 280.4665 + (36000.7698)t$ $L' = 218.3165 + (481267.8813)t$ $\Omega = 125.04452 - (1934.136261)t$ and, the nutations are calculated using the following equations:

$\Delta\psi = -17.20 \sin\psi - 1.32 \sin(2L) - 0.23 \sin(2L') + 0.21 \sin(2\Omega)$ $\Delta\varepsilon = 9.20 \cos\Omega + 0.57 \cos(2L) + 0.10 \cos(2L') - 0.09 \cos(2\Omega)$ then using, the equations for the position, r, and velocity, v, in the ECI frame to calculate the position and velocity in the ECEF frame using the dimensions of the earth, when longitude is calculated from the ECEF position by:

$$\psi = \arctan\left[\frac{r_y^{ECEF}}{r_x^{ECEF}}\right]$$

the geodetic latitude, $\varphi_{gd}$, is calculated using Bowring's method:

$$\beta = \arctan\left[\frac{r_z^{ECEF}}{(1-f)s}\right]$$

$$\varphi_{gd} = \arctan\left[\frac{r_z^{ECEF} + \frac{e^2(1-f)}{(1-e^2)} R \sin^3\beta}{s - e^2 R \cos^3\beta}\right]$$

next the geocentric latitude is calculated from the geodetic, $$\tan\varphi_{gc} = \frac{\left(\frac{a_e(1-e^2)}{\sqrt{1-e^2\sin^2\varphi_{gd}}} + h_{gd}\right)}{\left(\frac{a_e}{\sqrt{1-e^2\sin^2\varphi_{gd}}} + h_{gd}\right)} \tan\varphi_{gd}$$

where f is the flattening of the planet; $e^2$ is the square of the first eccentricity, or $e^2 = 1-(1-f)^2$; and $s = (r_x^{ECEF} + r_y^{ECEF})^{1/2}$ such calculation is iterated at least two times to provide a converged solution, known as the reduced latitude, that is calculated by:

$$\beta = \arctan\left[\frac{(1-f)\sin\varphi}{\cos\varphi}\right]$$

wherein the altitude, $h_E$, above Earth's surface is calculated with the following equation:

$h_E = (s \cdot \cos\varphi + r_z^{ECEF} + e^2 \bar{N} \sin\varphi) \sin\varphi - \bar{N}$ wherein the radius of curvature in the vertical prime, N, is found with $$\bar{N} = \frac{R}{[1 - e^2\sin^2\varphi]^{1/2}}$$

(vi) optionally updating said aerospace vehicle's propagated position by using the inertial coordinates in a propagation position and/or an attitude calculation wherein said calculation uses the at least one of a Kalman Filter, an Extended Kalman Filter and an Unscented Kalman Filter;

b) determining the aerospace vehicle's pose estimation between two points in time comprises:
   (i) having the aerospace vehicle acquire, at a time from Evening Civil Twilight to Morning Civil Twilight, at least two images of the Earth at different times, each of said at least two images containing at least one common terrestrial light feature;
   (ii) comparing said at least two images to find the at least one common terrestrial light feature;
   (iii) calculating the aerospace vehicle's pose by first converting image coordinates of the at least two images that were acquired by a camera to normalized coordinates using the following equations and method, wherein a reference frame of the camera is defined with a first axis aligned with the central longitudinal axis of the camera, a second axis, that is a translation of said first axis and a normalization of said camera's reference frame, a third axis that is a rotation and translation of said second axis to the top left corner of said at least two images with the x-axis aligned with the local horizontal direction and the y-axis pointing down on the side of the at least two images from the top left corner, and wherein said rotation is aided by a calibration matrix of the camera, containing focal lengths of an optical sensor, which maps to pixel lengths, $$X_c = \begin{bmatrix} x_{CAM} \\ y_{CAM} \\ z_{CAM} \end{bmatrix}$$

$$X_n = \begin{bmatrix} x_n \\ y_n \end{bmatrix} = \begin{bmatrix} x_{CAM}/z_{CAM} \\ y_{CAM}/z_{CAM} \end{bmatrix}$$

$$X_p = \begin{bmatrix} x_p \\ y_p \end{bmatrix} = \begin{bmatrix} f_c & 0 \\ 0 & f_c \end{bmatrix}\begin{bmatrix} x_n \\ y_n \end{bmatrix} + \begin{bmatrix} n_x/2 \\ n_y/2 \end{bmatrix}$$

(iv) calculating an essential matrix from the normalized coordinates and then recovering the pose from the essential matrix using the following equations, wherein the equation for the epipolar constraint is defined as follows:

$$\underline{x}_{n_1}^T (t \times R \underline{x}_{n_0}) = 0$$

and said equation for the epipolar constraint is rewritten as the following linear equation:

$$\underline{x}_{n_1}^T [t_x] R \underline{x}_{n_0} = 0$$

where $$[t]_x = \begin{bmatrix} 0 & -t_z & t_y \\ t_z & 0 & -t_x \\ -t_y & t_x & 0 \end{bmatrix}$$

wherein $[t_x]$ is saying the translation vector should be skewed (showing an operation) and $[t]_x$ is showing post-operation the skewed vector into a matrix the matrix $[t]_x$ is redefined using the Essential Matrix, E:

$$\underline{x}_{n_1}^T E \underline{x}_{n_0} = 0$$

where $$E = R[t]_x$$

and the Essential Matrix is scaled or unsealed and if scaled, then the scale is known from the two images, and reflects six degrees of freedom;
   wherein other constraints on the Essential Matrix are the following:

$$\det(E) = 0$$

$$2EE^T E - tr(EE^T)E = 0$$

or, when the epipolar constraint is applied to pixel coordinates, then a Fundamental Matrix, F, is used:

$$\underline{x}_{p_1}^T F \underline{x}_{p_0} = 0$$

said equation is then solved for the Fundamental Matrix and the pose is recovered from the Essential and/or Fundamental Matrices wherein said pose is defined as:

$$T = [R|t]$$

(iv) combining a known absolute position and attitude of the aerospace vehicle with the recovered pose to yield an updated attitude and estimated position for the aerospace vehicle wherein said combining step is achieved by using the following equations wherein the attitude, $C_1$ at the second image is defined by $$C_1 = C_0 + R$$

wherein $C_0$ and inertial position corresponding to the second image is found by adding the scaled change in position, t, to the previous inertial position:

$$r_1 = r_0 + t.$$

3. A module comprising: a central processing unit programmed to determine an aerospace vehicle's position with respect to the Earth, comprising determining the aerospace vehicle's pose estimation between two points in time and/or attitude with respect to the Earth wherein:
   a) determining the aerospace vehicle's position with respect to the Earth comprises:
      (i) having the aerospace vehicle acquire, at a time from Evening Civil Twilight to Morning Civil Twilight, an image of the Earth comprising at least one terrestrial light feature;
      (ii) matching said at least one terrestrial light feature of the image with at least one feature of a terrestrial light data base;
      (iii) weighting said matched images;
      (iv) optionally, calculating a propagated position for said aerospace vehicle and checking the result of said propagated position against the weighting;
      (v) using the time and the altitude that said image was taken to convert said weighted match into inertial coordinates;
      (vi) optionally updating said aerospace vehicle's propagated position by using the inertial coordinates in a propagation position and/or an attitude calculation; and/or
   b) determining the aerospace vehicle's pose estimation between two points in time comprises:
      (i) having the aerospace vehicle acquire, at a time from Evening Civil Twilight to Morning Civil Twilight, at least two images of the Earth at different times, each of said at least two images containing at least one common terrestrial light feature;

(ii) comparing said at least two images to find the at least one common terrestrial light feature;
(iii) calculating the aerospace vehicle's pose as follows:
converting image coordinates of the at least two images that were acquired by a camera to normalized coordinates;
calculating an essential matrix from the normalized coordinates and then recovering the pose from the essential matrix; or
converting image coordinates of the at least two images that were acquired by a camera to normalized coordinates;
converting the normalized coordinates to pixel coordinates;
calculating a fundamental matrix from the pixel coordinates and then recovering the pose;
(iv) combining a known absolute position and attitude of the aerospace vehicle with the recovered pose to yield an updated attitude and estimated position for the aerospace vehicle.

4. A module comprising: a central processing unit programmed to determine an aerospace vehicle's position with respect to the Earth, determining the aerospace vehicle's pose estimation between two points in time and/or attitude with respect to the Earth wherein:
a) determining the aerospace vehicle's position with respect to the Earth comprises:
(i) having the aerospace vehicle acquire, at a known general altitude and at a time from Evening Civil Twilight to Morning Civil Twilight, an image of the Earth comprising at least one terrestrial light feature;
(ii) matching, using Lowe's ratio test, said at least one terrestrial light feature of the image with at least one feature of a terrestrial light data base;
(iii) weighting, to a scale of one, said matched images;
(iv) optionally, calculating a propagated position for said aerospace vehicle using at least one of a Kalman Filter, an Extended Kalman Filter and an Unscented Kalman Filter, and checking the result of said propagated position against the weighting;
(v) using the time and the altitude that said image was taken at to convert said weighted match into inertial coordinates by transforming a state vector containing position and velocity from Earth-Centered-Earth-Fixed (ECEF) coordinates to Earth-Centered-Inertial (ECI) coordinates using the following equations:

$r^{ECI} = R r^{ECEF}$ $v^{ELI} = R v^{ECEF} + \dot{R} r^{ECEF}$ $R = \begin{bmatrix} -\sin\theta & -\cos\theta & 0 \\ \cos\theta & -\sin\theta & 0 \\ 0 & 0 & 0 \end{bmatrix}$ $\dot{R} = \omega_E R$ where $\theta$ represents the Greenwich Apparent Sidereal Time, measured in degrees and computed as follows:

$\theta = [\theta_m + \Delta\psi \cos(\varepsilon_m + \Delta\varepsilon)] \mod(360°)$ where the Greenwich mean sidereal time is calculated as follows:

$\theta_m = 100.46061837 + (36000.770053608)t + (0.000387933)t^2 - (1/38710000)t^3$ where t represents the Terrestrial Time, expressed in 24-hour periods and the Julian Day (JD):

$$t = \frac{JD - 2000 \text{ January } 01^d 12^h}{36525}$$

wherein the mean obliquity of the ecliptic is determined from:

$\varepsilon_m = 23°26'21.''448 - (46.''8150)t - (0.0''00059)t^2 + (0.''001813)t^3$ wherein the nutations in obliquity and longitude involve the following three trigonometric arguments:

$L = 280.4665 + (36000.7698)t$ $L' = 218.3165 + (481267.8813)t$ $\Omega = 125.04452 - (1934.136261)t$ and, the nutations are calculated using the following equations:

$\Delta\psi = -17.20 \sin\Omega - 1.32 \sin(2L) - 0.23 \sin(2L') + 0.21 \sin(2\Omega)$ $\Delta\varepsilon = 9.20 \cos\Omega + 0.57 \cos(2L) + 0.10 \cos(2L') - 0.09 \cos(2\Omega)$ then using, the equations for the position, r, and velocity, v, in the ECI frame to calculate the position and velocity in the ECEF frame using the dimensions of the earth,
when longitude is calculated from the ECEF position by:

$$\psi = \arctan\left[\frac{r_y^{ECEF}}{r_x^{ECEF}}\right]$$

the geodetic latitude, $\varphi_{gd}$, is calculated using Bowring's method:

$$\overline{\beta} = \arctan\left[\frac{r_z^{ECEF}}{(1-f)s}\right]$$

$$\varphi_{gd} = \arctan\left[\frac{r_z^{ECEF} + \frac{e^2(1-f)}{(1-e^2)}R\sin^3\beta}{s - e^2 R\cos^3\beta}\right]$$

next the geocentric latitude is calculated from the geodetic, $$\tan\varphi_{gc} = \frac{\left(\frac{a_e(1-e^2)}{\sqrt{1-e^2\sin^2\varphi_{gd}}} + h_{gd}\right)}{\left(\frac{a_3}{\sqrt{1-e^2\sin^2\varphi_{gd}}} + h_{gd}\right)}\tan\varphi_{gd}$$

where f is the flattening of the planet; $e^2$ is the square of the first eccentricity, or $e^2 = 1-(1-f)^2$; and $s = (r_x^{ECEF} + r_y^{ECEF})^{1/2}$ such calculation is iterated at least two times to provide a converged solution, known as the reduced latitude, that is calculated by:

$$\beta = \arctan\left[\frac{(1-f)\sin\varphi}{\cos\varphi}\right]$$

wherein the altitude, $h_E$, above Earth's surface is calculated with the following equation:

$$h_E = (s \cdot \cos\varphi + r_z^{ECEF} + e^2 \overline{N} \sin\varphi)\sin\varphi - \overline{N}$$

wherein the radius of curvature in the vertical prime, N, is found with $$\overline{N} = \frac{R}{[1 - e^2 \sin^2\varphi]^{1/2}}$$

(vi) optionally updating said aerospace vehicle's propagated position by using the inertial coordinates in a propagation position and/or an attitude calculation wherein said calculation uses the at least one of a Kalman Filter, an Extended Kalman Filter and an Unscented Kalman Filter;

b) determining the aerospace vehicle's pose estimation between two points in time comprises:

(i) having the aerospace vehicle acquire, at a time from Evening Civil Twilight to Morning Civil Twilight, at least two images of the Earth at different times, each of said at least two images containing at least one common terrestrial light feature;

(ii) comparing said at least two images to find the at least one common terrestrial light feature;

(iii) calculating the aerospace vehicle's pose by first, converting image coordinates of the at least two images that were acquired by a camera to normalized coordinates using the following equations and method, wherein a reference frame of the camera is defined with a first axis aligned with the central longitudinal axis of the camera, a second axis, that is a translation of said first axis and a normalization of said camera's reference frame, a third axis that is a rotation and translation of said second axis to the top left corner of said at least two images with the x-axis aligned with the local horizontal direction and the y-axis pointing down on the side of the at least two images from the top left corner, and wherein said rotation is aided by a calibration matrix of the camera, containing focal lengths of an optical sensor, which maps to pixel lengths, $$X_c = \begin{bmatrix} x_{CAM} \\ y_{CAM} \\ z_{CAM} \end{bmatrix}$$

$$X_n = \begin{bmatrix} x_n \\ y_n \end{bmatrix} = \begin{bmatrix} x_{CAM}/z_{CAM} \\ y_{CAM}/z_{CAM} \end{bmatrix}$$

$$X_p = \begin{bmatrix} x_p \\ y_p \end{bmatrix} = \begin{bmatrix} f_c & 0 \\ 0 & f_c \end{bmatrix}\begin{bmatrix} x_n \\ y_n \end{bmatrix} + \begin{bmatrix} n_x/2 \\ n_y/2 \end{bmatrix}$$

(iv) calculating an essential matrix from the normalized coordinates and then recovering the pose from the essential matrix using the following equations, wherein the equation for the epipolar constraint is defined as follows:

$$\underline{x}_{n_1}^T (t \times R\underline{x}_{m_o}) = 0$$

and said equation for the epipolar constraint is rewritten as the following linear equation:

$$\underline{x}_{n_1}^T [t_x] R\underline{x}_{n_o} = 0$$

where $$[t]_x = \begin{bmatrix} 0 & -t_z & t_y \\ t_z & 0 & -t_x \\ -t_y & t_x & 0 \end{bmatrix}$$

wherein $[t_x]$ is saying the translation vector should be skewed (showing an operation) and $[t]_x$ is showing post-operation the skewed vector into a matrix the matrix $[t]_x$ is redefined using the Essential Matrix, E:

$$\underline{x}_{n_1}^T E \underline{x}_{n_o} = 0$$

where $$E = R[t]_x$$

and the Essential Matrix is scaled or unscaled and if scaled, then the scale is known from the two images, and reflects six degrees of freedom;

wherein other constraints on the Essential Matrix are the following:

$$\det(E) = 0$$

$$2EE^T E - tr(EE^T)E = 0$$

or, when the epipolar constraint is applied to pixel coordinates, then a Fundamental Matrix, F, is used:

$$\underline{x}_{p_1}^T F \underline{x}_{p_o} = 0$$

said equation is then solved for the Fundamental Matrix and the pose is recovered from the Essential and/or Fundamental Matrices wherein said pose is defined as:

$$T = [R|t]$$

(iv) combining a known absolute position and attitude of the aerospace vehicle with the recovered pose to yield an updated attitude and estimated position for the aerospace vehicle wherein said combining step is achieved by using the following equations wherein the attitude, $C_1$ at the second image is defined by $$C_1 = C_0 + R$$

wherein $C_0$ and inertial position corresponding to the second image is found by adding the scaled change in position, t, to the previous inertial position:

$$r_1 = r_0 + t.$$

5. The module of claim 3 further comprising:
an input/output controller, a random access memory unit, and a hard drive memory unit, said input/output controller being configured to receive a first digital signal, and transmit a second digital signal comprising the updated aerospace vehicle's position and/or attitude, to said central processing unit.

6. The module of claim 5, wherein said first digital signal comprises data from a sensor.

7. The module of claim 6, wherein said first digital signal comprises digitized imagery.

8. The module of claim 4 further comprising:
an input/output controller, a random access memory unit, and a hard drive memory unit, said input/output controller being configured to receive a first digital signal, and transmit a second digital signal comprising the updated aerospace vehicle's position and/or attitude, to said central processing unit.

9. The module of claim 8, wherein said first digital signal comprises data from a sensor.

10. The module of claim 9, wherein said first digital signal comprises digitized imagery.

11. An aerospace vehicle comprising:
a sensor pointed towards the earth; an internal and/or an external power source for powering said aerospace vehicle; an onboard central processing unit a means to maneuver said aerospace vehicle and a module comprising: an input/output controller, a random access memory unit, and a hard drive memory unit, said input/output controller being configured to receive a first digital signal, and transmit a second digital signal comprising the updated aerospace vehicle's position and/or attitude, to said central processing unit, and a central processing unit programmed to determine an aerospace vehicle's position with respect to the Earth, comprising determining the aerospace vehicle's pose estimation between two points in time and/or attitude with respect to the Earth wherein:
 a) determining the aerospace vehicle's position with respect to the Earth comprises:
  (i) having the aerospace vehicle acquire, at a time from Evening Civil Twilight to Morning Civil Twilight, an image of the Earth comprising at least one terrestrial light feature;
  (ii) matching said at least one terrestrial light feature of the image with at least one feature of a terrestrial light data base;
  (iii) weighting said matched images;
  (iv) optionally, calculating a propagated position for said aerospace vehicle and checking the result of said propagated position against the weighting;
  (v) using the time and the altitude that said image was taken to convert said weighted match into inertial coordinates;
  (vi) optionally updating said aerospace vehicle's propagated position by using the inertial coordinates in a propagation position and/or an attitude calculation; and/or
 b) determining the aerospace vehicle's pose estimation between two points in time comprises:
  (i) having the aerospace vehicle acquire, at a time from Evening Civil Twilight to Morning Civil Twilight, at least two images of the Earth at different times, each of said at least two images containing at least one common terrestrial light feature;
  (ii) comparing said at least two images to find the at least one common terrestrial light feature;
  (iii) calculating the aerospace vehicle's pose as follows:
   converting image coordinates of the at least two images that were acquired by a camera to normalized coordinates;
   calculating an essential matrix from the normalized coordinates and then recovering the pose from the essential matrix; or
   converting image coordinates of the at least two images that were acquired by a camera to normalized coordinates;
   converting the normalized coordinates to pixel coordinates;
   calculating a fundamental matrix from the pixel coordinates and then recovering the pose;
  (iv) combining a known absolute position and attitude of the aerospace vehicle with the recovered pose to yield an updated attitude and estimated position for the aerospace vehicle.

12. The aerospace vehicle according to claim 11, wherein said sensor comprises a camera and said means to maneuver said aerospace vehicle comprises at least one of a flight control surface, a propeller, a thruster, an electric propulsion system, a magnetorquer, and a momentum wheel.

13. An aerospace vehicle comprising:
a sensor pointed towards the earth; an internal and/or an external power source for powering said aerospace vehicle; an onboard central processing unit a means to maneuver said aerospace vehicle and a module comprising: an input/output controller, a random access memory unit, and a hard drive memory unit, said input/output controller being configured to receive a first digital signal, and transmit a second digital signal comprising the updated aerospace vehicle's position and/or attitude, to said central processing unit, and a central processing unit programmed to determine an aerospace vehicle's position with respect to the Earth, determining the aerospace vehicle's pose estimation between two points in time and/or attitude with respect to the Earth wherein:
 a) determining the aerospace vehicle's position with respect to the Earth comprises:
  (i) having the aerospace vehicle acquire, at a known general altitude and at a time from Evening Civil Twilight to Morning Civil Twilight, an image of the Earth comprising at least one terrestrial light feature;
  (ii) matching, using Lowe's ratio test, said at least one terrestrial light feature of the image with at least one feature of a terrestrial light data base;
  (iii) weighting, to a scale of one, said matched images;
  (iv) optionally, calculating a propagated position for said aerospace vehicle using at least one of a Kalman Filter, an Extended Kalman Filter and an Unscented Kalman Filter, and checking the result of said propagated position against the weighting;
  (v) using the time and the altitude that said image was taken at to convert said weighted match into inertial coordinates by transforming a state vector containing position and velocity from Earth-Centered-Earth-Fixed (ECEF) coordinates to Earth-Centered-Inertial (ECI) coordinates using the following equations:

$r^{ECI}=Rr^{ECEF}$ $v^{ECI}=Rv^{ECEF}+\dot{R}r^{ECEF}$ $$R = \begin{bmatrix} -\sin\theta & -\cos\theta & 0 \\ \cos\theta & -\sin\theta & 0 \\ 0 & 0 & 0 \end{bmatrix}$$

$\dot{R}=\omega_E R$ where θ represents the Greenwich Apparent Sidereal Time, measured in degrees and computed as follows:

$\theta=[\theta_m+\Delta\psi \cos(\varepsilon_m+\Delta\varepsilon)]\cdot\mathrm{mod}(360°)$ where the Greenwich mean sidereal time is calculated as follows:

$\theta_m=100.46061837+(36000.770053608)t+(0.000387933)t^2-(1/38710000)t^3$ where t represents the Terrestrial Time, expressed in 24-hour periods and the Julian Day (JD):

$$t = \frac{JD - 2000\ \mathrm{January}\ 01^d 12^h}{36525}$$

wherein the mean obliquity of the ecliptic is determined from:

$\varepsilon_m=23°26'21."448-(46."8150)t-(0.0"00059)t^2+(0."001813)t^3$ wherein the nutations in obliquity and longitude involve the following three trigonometric arguments:

$L=280.4665+(36000.7698)t$ $L'=218.3165+(481267.8813)t$ $\Omega=125.04452-(1934.136261)t$ and, the nutations are calculated using the following equations:

$\Delta\psi=-17.20 \sin \Omega-1.32 \sin(2L)-0.23 \sin(2L')+0.21 \sin(2\Omega)$ $\Delta\varepsilon=9.20 \cos \Omega+0.57 \cos(2L)+0.10 \cos(2L')-0.09 \cos(2\Omega)$ then using, the equations for the position, r, and velocity, v, in the ECI frame to calculate the position and velocity in the ECEF frame using the dimensions of the earth, when longitude is calculated from the ECEF position by:

$$\psi = \arctan\left[\frac{r_c^{ECEF}}{r_x^{ECEF}}\right]$$

the geodetic latitude, $\varphi_{gd}$, is calculated using Bowring's method:

$$\bar{\beta} = \arctan\left[\frac{r_z^{ECEF}}{(1-f)s}\right]$$

$$\varphi_{gd} = \arctan\left[\frac{r_z^{ECEF} + \frac{e^2(1-f)}{(1-e^2)}R\sin^3\beta}{s - e^2 R\cos^3\beta}\right]$$

next the geocentric latitude is calculated from the geodetic, $$\tan\varphi_{gc} = \frac{\left(\frac{a_e(1-e^2)}{\sqrt{1-e^2\sin^2\varphi_{gd}}} + h_{gd}\right)}{\left(\frac{a_e}{\sqrt{1-e^2\sin^2\varphi_{gd}}} + h_{gd}\right)}\tan\varphi_{gd}$$

where f is the flattening of the planet $e^2$ is the square of the first eccentricity, or $e^2=1-(1-f)^2$; and $s=(r_x^{ECEF}+r_y^{ECEF})^{1/2}$ such calculation is iterated at least two times to provide a converged solution, known as the reduced latitude, that is calculated by:

$$\beta = \arctan\left[\frac{(1-f)\sin\varphi}{\cos\varphi}\right]$$

wherein the altitude, $h_E$, above Earth's surface is calculated with the following equation:

$h_E=(s\cdot\cos \varphi+r_z^{ECEF}+e^2\overline{N} \sin \varphi)\sin \varphi-\overline{N}$ wherein the radius of curvature in the vertical prime, $\overline{N}$, is found with $$\overline{N} = \frac{R}{[1-e^2\sin^2\varphi]^{1/2}}$$

(vi) optionally updating said aerospace vehicle's propagated position by using the inertial coordinates in a propagation position and/or an attitude calculation wherein said calculation uses the at least one of a Kalman Filter, an Extended Kalman Filter and an Unscented Kalman Filter;

b) determining the aerospace vehicle's pose estimation between two points in time comprises:
  (i) having the aerospace vehicle acquire, at a time from Evening Civil Twilight to Morning Civil Twilight, at least two images of the Earth at different times, each of said at least two images containing at least one common terrestrial light feature;
  (ii) comparing said at least two images to find the at least one common terrestrial light feature;
  (iii) calculating the aerospace vehicle's pose by first, converting image coordinates of the at least two images that were acquired by a camera to normalized coordinates using the following equations and method, wherein a reference frame of the camera is defined with a first axis aligned with the central longitudinal axis of the camera, a second axis, that is a translation of said first axis and a normalization of said camera's reference frame, a third axis that is a rotation and translation of said second axis to the top left corner of said at least two images with the x-axis aligned with the local horizontal direction and the y-axis pointing down on the side of the at least two images from the top left corner, and wherein said rotation is aided by a calibration matrix of the camera, containing focal lengths of an optical sensor, which maps to pixel lengths, $$X_c = \begin{bmatrix} x_{CAM} \\ y_{CAM} \\ z_{CAM} \end{bmatrix}$$

$$X_n = \begin{bmatrix} x_n \\ y_n \end{bmatrix} = \begin{bmatrix} x_{CAM}/z_{CAM} \\ y_{CAM}/z_{CAM} \end{bmatrix}$$

$$X_p = \begin{bmatrix} x_p \\ y_p \end{bmatrix} = \begin{bmatrix} f_c & 0 \\ 0 & f_c \end{bmatrix} \begin{bmatrix} x_n \\ y_n \end{bmatrix} + \begin{bmatrix} n_x/2 \\ n_y/2 \end{bmatrix}$$

(iv) calculating an essential matrix from the normalized coordinates and then recovering the pose from the essential matrix using the following equations, wherein the equation for the epipolar constraint is defined as follows:

$$\underline{x}_{n_1}^T (t \times R \underline{x}_{n_o}) = 0$$

and said equation for the epipolar constraint is rewritten as the following linear equation:

$$\underline{x}_{n_1}^T [t_x] R \underline{x}_{n_o} = 0$$

where $$[t]_x = \begin{bmatrix} 0 & -t_z & t_y \\ t_z & 0 & -t_x \\ -t_y & t_x & 0 \end{bmatrix}$$

wherein $[t_x]$ is saying the translation vector should be skewed (showing an operation) and $[t]_x$ is showing post-operation the skewed vector into a matrix the matrix $[t]_x$ is redefined using the Essential Matrix, E:

$$\underline{x}_{n_1}^T E \underline{x}_{n_o} = 0$$

where $$E = R[t]_x$$

and the Essential Matrix is scaled or unscaled and if scaled, then the scale is known from the two images, and reflects six degrees of freedom;

wherein other constraints on the Essential Matrix are the following:

$$\det(E) = 0$$

$$2EE^T E - tr(EE^T)E = 0$$

or, when the epipolar constraint is applied to pixel coordinates, then a Fundamental Matrix, F, is used:

$$\underline{x}_{p_1}^T F \underline{x}_{p_o} = 0$$

said equation is then solved for the Fundamental Matrix and the pose is recovered from the Essential and/or Fundamental Matrices wherein said pose is defined as:

$$T = [R | t]$$

(iv) combining a known absolute position and attitude of the aerospace vehicle with the recovered pose to yield an updated attitude and estimated position for the aerospace vehicle wherein said combining step is achieved by using the following equations wherein the attitude, $C_1$ at the second image is defined by $$C_1 = C_0 + R$$

wherein $C_0$ and inertial position corresponding to the second image is found by adding the scaled change in position, t, to the previous inertial position:

$$r_1 = r_0 + t.$$

14. The aerospace vehicle according to claim 13, wherein said sensor comprises a camera and said means to maneuver said aerospace vehicle comprise at least one of a flight control surface, a propeller, a thruster, an electric propulsion system, a magnetorquer, and a momentum wheel.

\* \* \* \* \*